United States Patent [19]
Kotani et al.

[11] Patent Number: 5,987,029
[45] Date of Patent: Nov. 16, 1999

[54] INFORMATION COLLECTING APPARATUS, RECEIVING INFORMATION PROCESSING APPARATUS AND INFORMATION TRANSMITTING APPARATUS

[75] Inventors: Seigo Kotani, Kobe; Toshimitsu Suzuki, Akashi, both of Japan

[73] Assignee: Fujitsu Limited, Kawasaki, Japan

[21] Appl. No.: 08/821,727

[22] Filed: Mar. 20, 1997

[30] Foreign Application Priority Data

Aug. 8, 1996 [JP] Japan .................................. 8-209795

[51] Int. Cl.$^6$ .............................. H04L 12/28; H04L 12/56
[52] U.S. Cl. .......................................... 370/389; 455/557
[58] Field of Search ..................................... 370/338, 401,
370/402, 349; 455/45, 66, 154, 158.4, 557,
517, 418, 507, 31.3; 348/7, 8, 12, 13, 552,
570, 730, 739, 751

[56] References Cited

U.S. PATENT DOCUMENTS

| | | |
|---|---|---|
| 5,555,446 | 9/1996 | Jasinski .................................. 455/517 |
| 5,594,952 | 1/1997 | Virtuoso et al. ......................... 455/557 |
| 5,617,565 | 4/1997 | Augenbraun et al. ...................... 707/4 |
| 5,666,362 | 9/1997 | Chen et al. .............................. 370/420 |
| 5,684,859 | 11/1997 | Chanroo et al. ........................ 455/31.3 |
| 5,715,453 | 2/1998 | Stewart ................................... 707/104 |
| 5,722,040 | 2/1998 | Bjerede et al. .......................... 370/481 |
| 5,722,047 | 2/1998 | Murayama ................................ 455/45 |
| 5,732,074 | 3/1998 | Spaur et al. ............................ 370/401 |
| 5,752,186 | 5/1998 | Malackowski et al. ................ 455/414 |
| 5,778,181 | 7/1998 | Hidary et al. ............................. 348/12 |
| 5,778,372 | 7/1998 | Cordell et al. .......................... 707/100 |
| 5,791,992 | 8/1998 | Crump et al. ............................. 463/41 |
| 5,818,441 | 10/1998 | Throckmorton et al. .................... 348/7 |

FOREIGN PATENT DOCUMENTS

09162818  6/1997  Japan .

Primary Examiner—Douglas W. Olms
Assistant Examiner—Phirin Sam
Attorney, Agent, or Firm—Staas & Halsey, LLP

[57] ABSTRACT

An information collecting apparatus comprises a reception-only communication unit and a two-way communication unit. The information collecting apparatus extracts an address to be accessed by the two-way communication unit from data received by the reception-only communication unit and fetches a file stored at the address. The information collecting utilizes the two-way communication unit. An information transmitting apparatus transmits data, having standards including a dummy area to transmit the data, after the address of the file accessed by the two-way communication system independent of the transmitting system is described in the dummy area.

10 Claims, 8 Drawing Sheets

INFORMATION COLLECTING APPARATUS, RECEIVING INFORMATION PROCESSING APPARATUS AND INFORMATION TRANSMITTING APPARATUS

CROSS-REFERENCE TO RELATED APPLICATIONS

This application is based on, and claims priority to, Japanese Patent application 8-209795, filed Aug. 8, 1996 in Japan, and which is incorporated herein by reference.

BACKGROUND OF THE INVENTION

1. Field of the Invention

The present invention relates to an information collecting apparatus comprising a receiving information processing apparatus and collecting information through two-way communication, and an information transmitting apparatus transmitting information to an information processing apparatus.

2. Description of the Related Art

Reductions in the size and weight of computers through downsizing have been particularly rapid and distinctive in recent years. A computer having the power and capability of a previously-designed large-scale computer has been reduced enough in size and weight to be carried with only one hand. This reduction in size and weight has occurred through introduction of liquid crystal into the display, increased integration density of arithmetic and memory elements, and higher capacity of the battery.

Moreover, the use of radio telephone systems as communication systems has become more widespread, enabling easier communication through a mobile telephone apparatus.

In addition, the INTERNET, which is accepted as an international network of computer communication, is now propagating explosively, also enabling quicker and easier access to information.

In a modern, information-oriented society, attention is devoted to a portable-type of information apparatus referred to us an Internet viewer. The Internet viewer is small enough to be carried with only one hand, and is a display terminal which displays on a display information received through a communication unit connecting the Internet Viewer to the INTERNET. By simplifying the functions of an ordinary personal computer, the Internet viewer is also intended to be light-weight and have a low price.

As explained above, effort has been made to a provide a low-price terminal for the use with the INTERNET. However, communication costs remain high. Using an example of the cost of communication in Japan, when a portable type telephone set is used as the communication unit, approximately ¥100 must be paid for a communication time lasting three minutes. Even when the personal handy-phone system (herein after referred to as PHS, in which service was started in 1995) is used, approximately ¥10 is required for a communication time lasting one minute.

Therefore, communication costs may be assumed to increase extraordinarily when retrieving various pieces of information using an Internet viewer.

Moreover, the INTERNET is also well appreciated as a mass-medium which is an alternative to or complementary to existing broadcast media or newspapers. In communicating over the INTERNET, the information sending party opens its home page for the convenience of allowing the information receiving party (such as a user having a terminal like the Internet viewer) to read information therefrom. When a mass-medium transmits information for services, it is preferable that such information is available to as large a number of users as is possible. But if users attempt to access the same home page, the increase in traffic is a problem. When traffic increases, users are placed in a queue, making information access more difficult and removing an advantage of using the INTERNET. Moreover, if users are forced to feel inconvenienced, the mass-medium itself prevents appears to prevent comfortable use of the INTERNET. Therefore, it is undesirable for the information transmitting party to bring about such a result.

SUMMARY OF THE INVENTION

The present invention overcomes the problems described above.

It is therefore an object of the present invention to provide an apparatus through which an information receiving party (or user) can retrieve necessary information at a lower communication cost and with a quicker response.

Another object of the present invention is to provide an improved Internet viewer.

It is a further object of the present invention to provide an information transmitting apparatus which transmits information to one or more information collecting apparatuses.

There are two main aspects of the present invention: an information transmitting apparatus and an information collecting apparatus.

Figure 7:
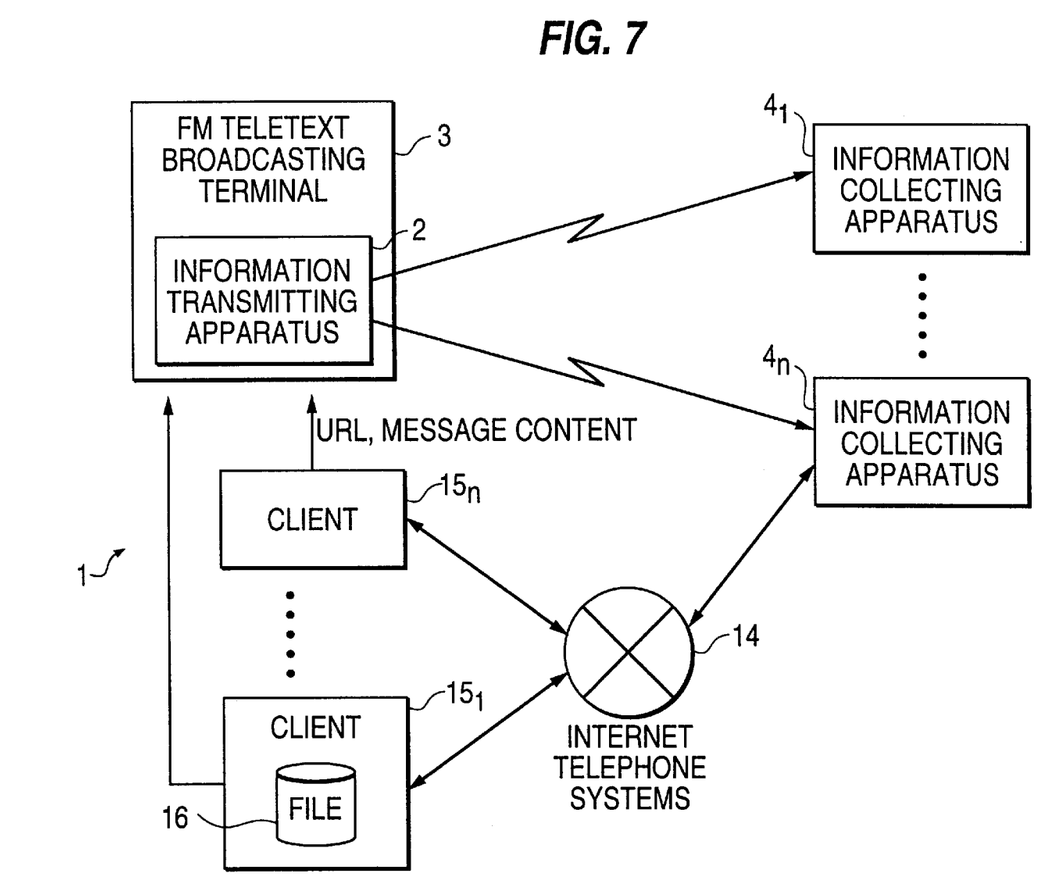
FIG. 7 is an overview of the information transmitting apparatus and the information collecting apparatus of the present invention.

FIG. 7 shows an overview of relationships between an information transmitting apparatus 2 of the present invention and information collecting apparatuses $4_1$ through $4_n$ of the present invention.

As shown in the information apparatus 1 of FIG. 7, the information transmitting apparatus 2 of the present invention is included in, for example, an FM teletext broadcasting terminal 3. Also included in the FM teletext broadcasting terminal 3 are an FM broadcast multiplexing unit and an FM modulation oscillator. FM broadcast multiplexing unit 12 and FM modulation oscillator 13 are not shown in FIG. 7, but are shown and explained below with reference to FIG. 1.

Also as shown in FIG. 7, the information transmitting apparatus 2 of the present invention transmits data to multiple information collecting apparatuses $4_1$ through $4_n$ of the present invention.

The FM teletext broadcasting terminal 3 transmits information including a URL (explained below) and a message content at a client's $15_1 \ldots 15_n$ request. Each of the clients $15_1 \ldots 15_n$ have a corresponding file 16 accessible by using the INTERNET 14. The file 16 comprises detailed information, such as advertising information.

Accordingly, and as shown in FIG. 7, in the present invention, the information transmitting apparatus 2 does not require a two-way communication unit to receive a request for detailed information from an information collecting apparatus $4_1 \ldots 4_n$ of the present invention.

Figure 8:
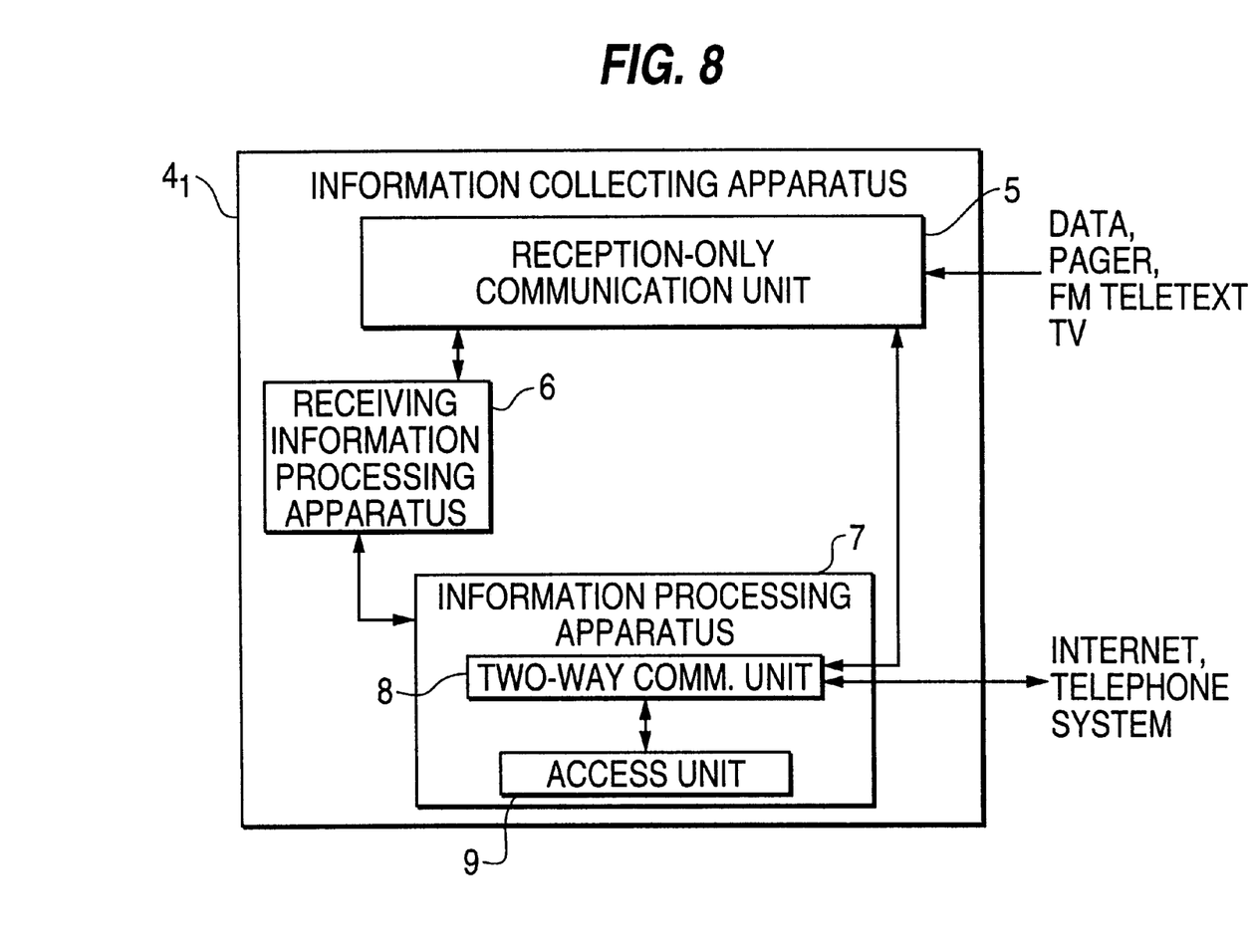
FIG. 8 is an overview of an information collecting apparatus of the present invention.

FIG. 8 shows an overview of one of the information collecting apparatuses $4_1$ of the present invention.

The information collecting apparatus $4_1$ of the present invention comprises a reception-only communication unit 5, a two-way communication unit 8, and an access unit 9. The access unit 9 of the present invention extracts an accessible address through the two-way communication unit 8 from the data received by the reception-only communication unit 8 to fetch files existing at the address using the two-way communication unit 8.

The two-way communication unit 8 provides a communication unit accessible to the INTERNET and personal computer communications and generally uses the widespread telephone system. To form a portable type of information processing apparatus, use of a portable type telephone set or PHS is recommended. However, the use of the wired telephone system is not excluded.

Moreover, using the reception-only communication unit 8, a pager system and a broadcast system such as FM teletext, TV teletext and ordinary TV broadcast, etc., are introduced. Accordingly, the cost to the receiving party (the information collecting apparatus side) can be reduced to zero.

In addition, since the problem of increased traffic can be eliminated by employment of the broadcast system, the receiving side is never placed in the queue. Further, as shown in FIG. 7, the transmitting side, via the information transmitting apparatus 2 of the present invention, can address many information collecting apparatuses $4_1$ through $4_n$ at a time to send information to many users, at a comparatively low cost.

As described above, according to the information collecting apparatus of the present invention, information is received by a low cost communication system and files having detailed information corresponding to the received data obtained can be accessed through the two-way communication unit. Therefore, information can be collected, as a result, at a lower cost than that required by communication using only the two-way communication unit.

As the address which can be accessed through the two-way communication unit, the URL (which is the web address, and is also known as the Uniform Resources Locator) of the INTERNET, for example, may be used. Also a receiver can be used as the reception-only communication unit, which can receive FM teletext specified by conventional DARC standards (or standards conforming to DARC standards, to be discussed hereinafter) and to form an access unit to extract the address described in a dummy area provided in the page data of the FM teletext data specified by the DARC standards. Communication facilities similar to those of the prior art can be used by writing address information into the prepared dummy area, but those communication facilities are not preferred.

Moreover, the reception-only communication unit comprises a memory storing received data, and a power supply driver which drives the power supply independent of the two-way communication unit and access unit. Accordingly, information reception is enabled even if the power supply for the two-way communication unit and the access unit (usually a personal computer) which consumes a large amount of electrical power is not turned on. Power saving is therefore realized in the present invention.

The power supply driver of the present invention may be realized by an independent power supply or by power supply circuits respectively isolated and extended from the same power supply supplying power to the two-way communication unit and the access unit. The power supply circuits are respectively isolated by providing circuits for controlling the feeing of power depending on the respective conditions, to change the driving condition of the power supply.

In the present invention, it is desirable to select detailed information to be obtained on the basis of the received data so that a user can get interesting detail and information at a low communication cost.

For this purpose, the total structure of the present invention includes a display displaying the data, for example, received by the reception-only communication unit or the data as a part of such received data, and an input unit accepting an input instruction selecting the data displayed on the display. Moreover, in the present invention, the access unit executes an access using the two-way communication unit by extracting the address included in the received data indicated to be selected by the input unit.

As a more practical implementation of the embodiment of the information collecting apparatus of the present invention, the reception-only communication unit is a receiver for receiving FM teletext specified by DARC standards, the display displays the header character string and message character string of page data of the FM teletext. The display also displays the URL described in the dummy area of such page data and a button linked to URL. Further, the input unit is used as a pointing device to detect the point of input on the display at which the URL displayed or the button linked to URL, and the access unit executes the operation to fetch the file of corresponding URL based on the point of input.

Even in such a structure, in order to realize power saving by feeding the electrical power only to the reception-only communication unit, a preferred embodiment of the reception-only communication unit includes the power supply driver for the power supply drive independent of the memory for storing received data, the two-way communication unit, the display, the input unit and the access unit.

Moreover, information is selected by using a keyword previously registered. Further, detailed information is collected by selecting only the information included in this keyword. A keyword registration unit registering a retrieving keyword and a retrieving unit storing the registered keywords and retrieving the received data using such registered keywords are provided in the present invention. Further, the access unit executes the access from the two-way communication unit by extracting the address corresponding to the received data including the registered keywords.

In such an embodiment of the present invention, the reception-only communication unit is preferably provided with a memory storing received data, and, also a power supply driver, which is a driving power supply, driving the reception-only communication unit and the retrieving unit, so that the power supply is driven independent of the driving power supply for the two-way communication unit, keyword registering unit and access unit. In this case, the electrical power is also fed to the retrieving unit as well as the reception-only communication unit, since data is continuously received from a broadcast, etc., the amount of data to be transferred to the main unit must be reduced by previously selecting the information. Moreover, the retrieving unit controls driving the access unit when the received data including the registered keyword is extracted, in a preferred embodiment of the present invention. Accordingly, the access unit (on the information processing apparatus side) is started, even if the power switch is turned off or the apparatus is set to the power saving condition, when the important information is included in the information received from the broadcast, etc. Therefore, significant information can be obtained quickly even with power saving.

Moreover, a display displaying received data retrieved by the retrieving unit or data as a part of the received data and an input unit accepting instruction input selecting the data displayed on the display are provided in the present invention. Also in the present invention, the access unit is structured to extract the address corresponding to the received data instructed to be selected by the input unit, to enable access from the two-way communication unit in order to select effectively the information.

As a preferred embodiment of the present invention, the reception-only communication unit comprises a receiver receiving FM teletext specified by the DARC standards, while the display displays the URL described in the dummy area of the page data or a button linked to URL in addition, to the header character string and message character string to the page data of the FM teletext, the input unit comprises a pointing device to detect the point of input on the display at which the URL is displayed or the button linked to the URL, and the access unit executes the operation to fetch the corresponding URL files based on the point of input.

In this embodiment of the present invention, it is also preferable for the reception-only communication unit to realize power saving by having the driving power supply driving the reception-only communication unit and retrieving unit independent of the driving power supply driving the two-way communication unit, the keyword registering unit, the display unit, the input unit and the access unit.

Moreover, the receiving information processing apparatus of the present invention which constitutes the information collecting apparatus explained above is explained hereunder.

The receiving information processing apparatus 6 of the present invention is inserted and connected between the information processing apparatus 7 comprising the two-way communication unit 8, the access unit executing communication 9 by utilizing the two-way communication unit and keyword registering unit accepting the keyword registration input, and the reception-only communication unit 5, as shown in FIG. 8. The receiving information processing apparatus of the present invention is characterized in that the keywords registered in the keyword registering unit are stored, the data received by the reception-only communication unit is retrieved using the keyword, and the received data having the keyword is transferred to the information processing apparatus.

The receiving information processing apparatus of the present information is inserted and connected between the information processing apparatus including the two-way communication unit (generally, a connected personal computer including the telephone communication unit) and the pager-type receiver or reception-only communication unit such as a broadcast receiver.

Apparatuses which may be available in the market may be used to form the information processing apparatus and reception-only communication unit. Thus, the information collecting apparatus formed by such a receiving information processing apparatus and explained above may be implemented by apparatuses available on the market.

Otherwise, as the receiving information processing apparatus comprising the receiver (FM teletext receiver, etc.) which may be available in the market, a PCMCIA card is used and may be combined with a notebook-type of personal computer.

In addition, the receiving information processing apparatus of the present invention converts the data format received by the reception-only communication unit into the data format to be processed by the information processing apparatus (for example, the FM teletext data specified by the DARC standards is converted into HTML (Hypertext Markup Language) document format). Furthermore, when the received data including registered keyword is extracted, the access unit of the information processing apparatus is controlled to start.

The information transmitting apparatus of the present invention explained above transmits the transmitting data having the standards including the dummy area. The transmitting data is transmitted following the address of the file to be accessed by the two-way communication system independent of the transmitting system described in the dummy area.

Standards for the transmitting data are similar to those of the FM teletext conforming, for example, to the DARC standards the URL of the INTERNET is used as the address.

As described above, the detailed information is transmitted with the addition of only the address thereof and thereby the index information of a larger amount of information can be transmitted simultaneously to many users at a lower communication cost. The amount of traffic is reduced by leaving the freedom of selection to the receiving side (user side of the information collecting apparatus) for access to the detailed information.

The services explained above can be offered, without provision of any novel and particular communication facilities, by transmitting the data after the address is described in the dummy area of the communication standards having the dummy area.

The above and further objects and features of the invention will be more fully apparent from the following detailed description with accompanying drawings, wherein like numerals refer to like parts, throughout.

DESCRIPTION OF THE PREFERRED EMBODIMENTS

The preferred embodiment of the present invention will be explained with reference to the accompanying drawings. In the embodiment of the present invention, the FM teletext is employed as the communication system used for the reception-only communication unit in the terminal of receiving side, while PHS is used as the broadcast unit utilized in the two-way communication unit to realize the function as the Internet viewer.

1) Information Transmitting Apparatus

An embodiment of the information transmitting apparatus 10 of the present invention will be explained by referring to FIG. 1 to FIG. 3.

Figure 1:
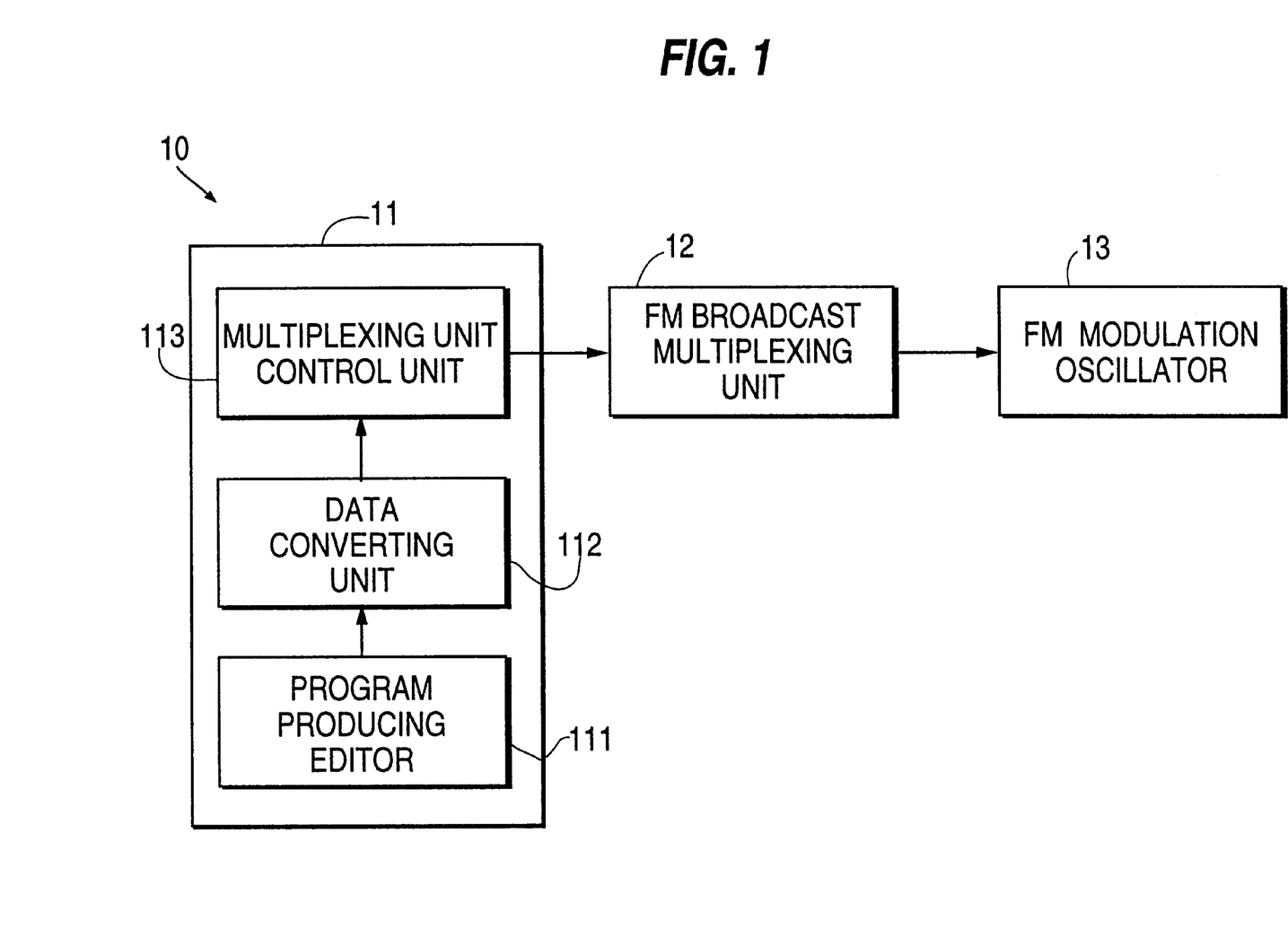
FIG. 1 is a block diagram showing an embodiment of an information transmitting apparatus of the present invention.

FIG. 1 is a diagram showing an embodiment of the information transmitting apparatus 10 of the present invention.

In FIG. 1, a program is produced using a personal computer 11 comprising a program producing editor 111, a data converting unit (program) 112 converting the data produced by the program producing editor 111 into DARC (which are standards of teletext), and a multiplexing unit controller 113 controlling a multiplexing unit. DARC is the original standard of character multiplexing broadcast in Japan. However, any standard can be used. For example, international standards established on the basis of the DARC standards can be used.

The personal computer 11 transmits information including a URL on an FM teletext broadcast.

Also as shown in FIG. 1, FM broadcast multiplexing unit 12 multiplexes the DARC format data and FM music data and combines these data with a pilot signal for transmission to an oscillator. Both the pilot signal and the FM broadcast music data are input to the FM broadcast multiplexing unit 12.

FM modulation oscillator 13 transmits the FM broadcast. An apparatus available in the market can also be used for FM modulation oscillator 13.

Each of the FM broadcast multiplexing unit 12 and the FM modulation oscillator 13 may be included in an FM teletext broadcasting terminal 3 shown in FIG. 7.

Figure 2:
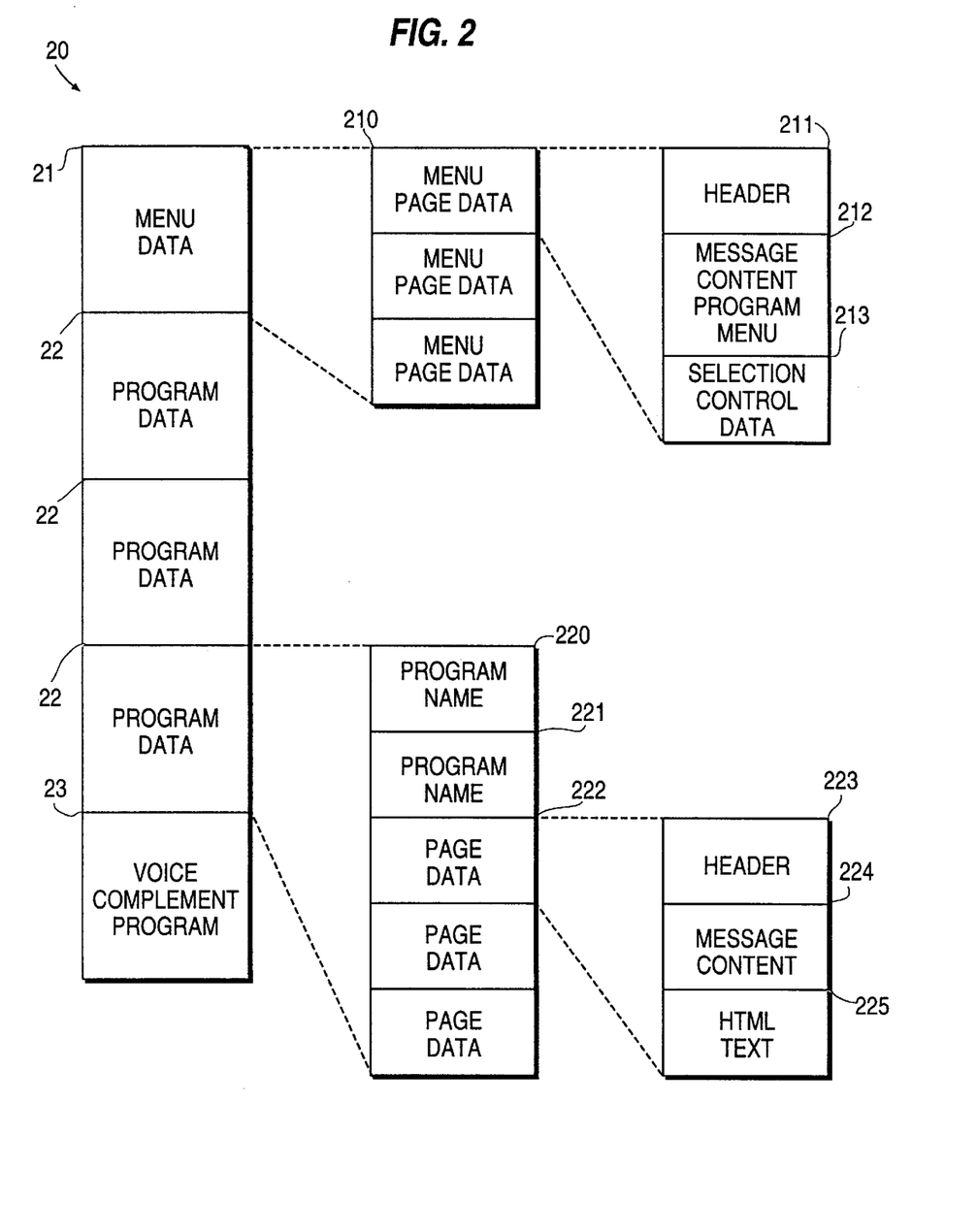
FIG. 2 is a diagram showing the FM teletext data format transmitted by the information transmitting apparatus of FIG. 1.

FIG. 2 is a diagram showing a broadcast data format 20 produced by the information transmitting apparatus 10 of FIG. 1.

This broadcast data conforms to DARC (standards of teletext). As shown in FIG. 2, the broadcast data comprises a menu data 21, one or a plurality of program data 22, and voice complement program data 23.

The menu data 21 comprises one or a plurality of menu page data 210. Each menu page data 210 comprises a header 211 (character information such as title of menu page), a program menu 212 as the message content (character information), and a selection control data 213. The character information of program menu 212 is displayed on the display unit of the terminal for FM character broadcast. Moreover, the selection control data 213 includes a description of correspondence between the key-in number of the terminal and destination (address) information of the page data 22 of the program described later. Therefore, when a user watching the program menu executes the key-in operation for program selection, the page data 22 of the corresponding program is read and displayed.

The program data 22 comprises a program name 220 (for example, news, weather forecast, road traffic condition, etc.), program number 221, and one or a plurality of page data 222.

The voice complement program data 23 defines the region in which data of a program offered only by a voice signal is stored but is not essential in the present invention.

The page data 222 comprises a header 223 indicating the title of the page, message content 224, and HTML text 225.

The header 223 comprises a character string (character information) of 15.5 characters, while the message content 224 is formed of a character string (character information) of 15.5 characters. The HTML text 225 comprises a URL indicating the address of the detailed information (file) corresponding to the page data 22 on the INTERNET and the title of this URL.

This HTML text is included, in the DARC standards, in the region not displayed as the dummy text. In the above-mentioned embodiment, the existing FM teletext system is introduced.

Referring to FIG. 1 again, information transmitting procedures by the information transmitting apparatus 10 of the present invention will then be explained. In the information transmitting side, a page data to be transmitted is generated using the program producing editor 111. An example of the display screen (display window) of this program producing editor 111 is shown in FIG. 3.

Figure 3:
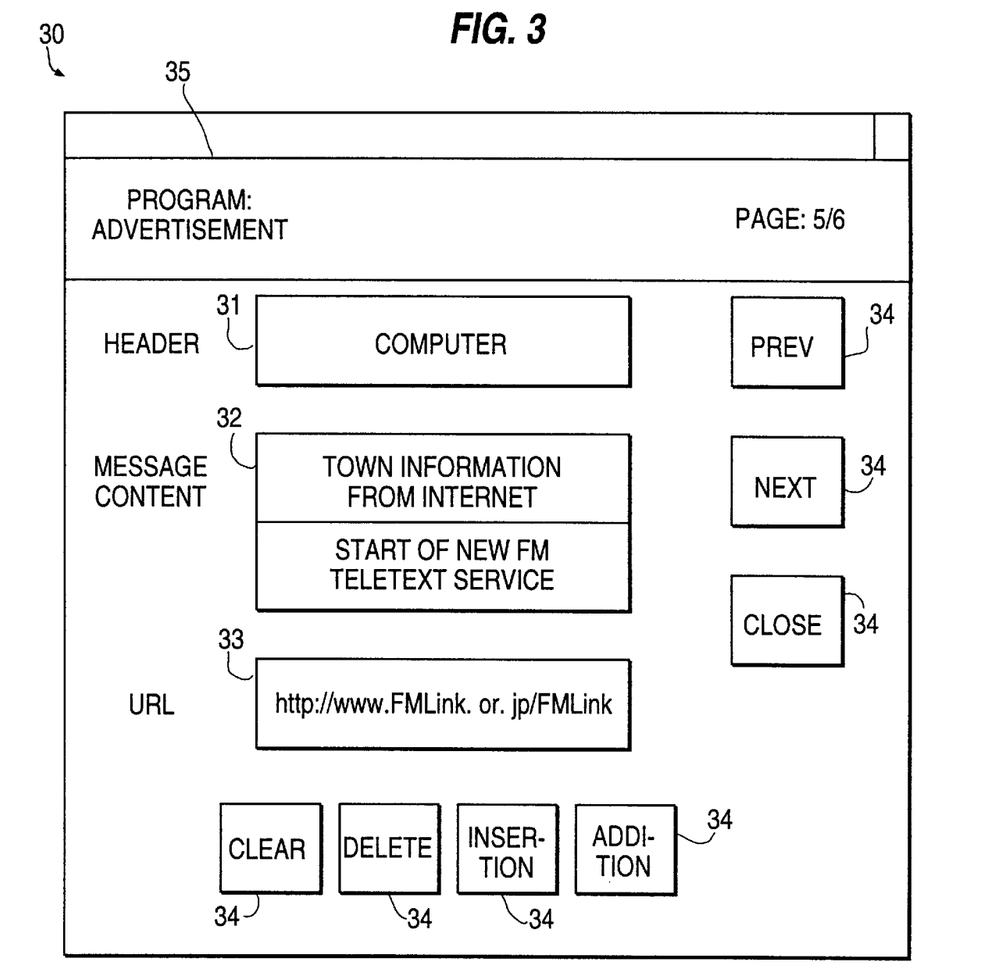
FIG. 3 shows an example of the display window of program producing editor of the information transmitting apparatus of FIG. 1.

In columns (areas) 31, 32, and 33 shown in FIG. 3, a character string is described by a producer. In column 31, a header is written, while column 32, the message content is written. In column 33, the URL of the detailed information corresponding to the page data is first written, followed by (after the comma (,)) a character string which becomes a link button to the URL.

Button 34 instructs a character input operation to each column and also instructs a window control to define the area for accepting instruction to the pointing device.

Program name 35 corresponds to element 220 in FIG. 2.

Program information generated by the program producing editor 111 is converted, by the data converting unit 112, into the broadcast data based on the DARC standards as shown in FIG. 2.

The broadcast data of the DARC standards converted by the data converting unit is multiplexed, under the control of the multiplexing unit control unit 113 shown in FIG. 1, with FM music data by the FM teletext multiplexing unit 12. The broadcast data is then combined with the pilot signal and is transferred to the oscillator 12 and is then broadcast after FM modulation by the FM modulation oscillator 13.

2) Information Collecting Apparatus (Internet Viewer)

Next, an embodiment of the information processing apparatus 40 of the present invention will be explained by referring to FIG. 4 to FIG. 6. The information collecting apparatus 40 of this embodiment is an Internet viewer utilizing the information transmitted by the information transmitting apparatus 10 explained above.

Figure 4:
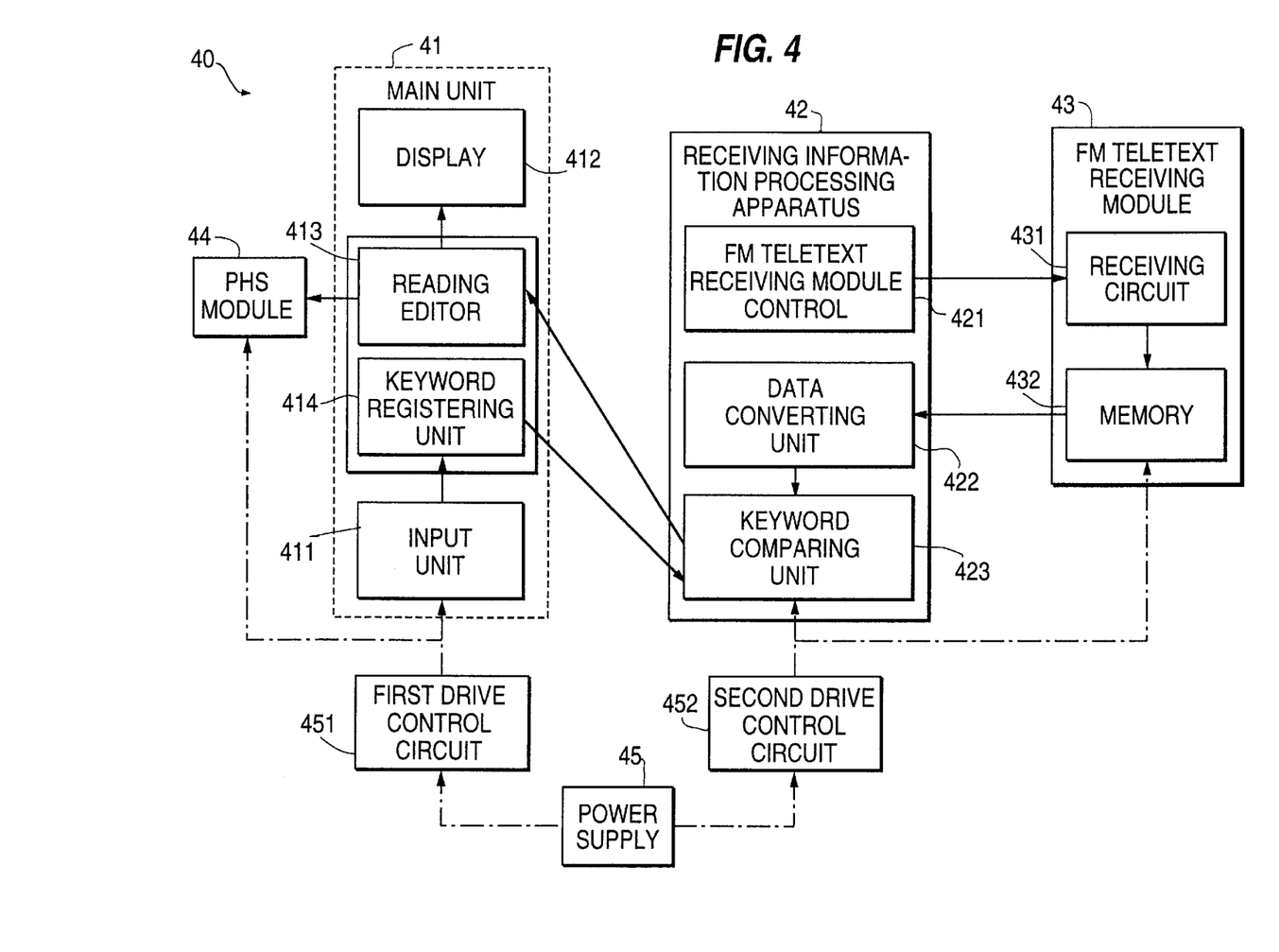
FIG. 4 is a block diagram showing an embodiment of an information collecting apparatus of the present information.
Figure 5:
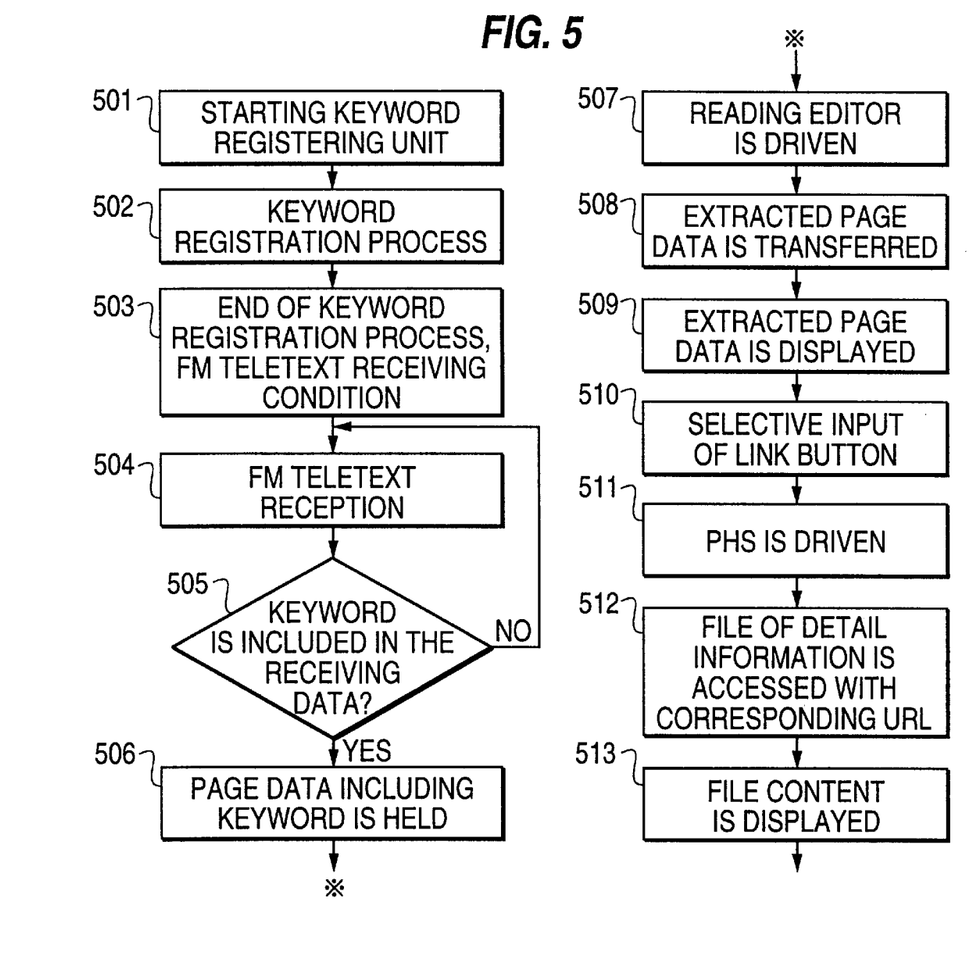
FIG. 5 is a flowchart showing operations of the information collecting apparatus of FIG. 4.

FIG. 4 shows an embodiment of the information collecting apparatus 40 of the present invention.

A main unit 41 of the information collecting apparatus 40 comprises, like an ordinary information processing terminal, a reading editor 413, including an HTML browser, and a keyword registering unit 414 as the software being executed by the CPU (not illustrated). In addition, the main unit 41 further comprises an input unit 411 such as a keyboard and a mouse, and a display 412. An ordinary personal computer may be used as the main unit 41. Moreover, the main unit 41 may also comprise the information processing terminal characterized as an Internet viewer, by reducing the functions of an ordinary personal computer.

Referring again to FIG. 4, a receiving information processing module 42 comprises an FM teletext receiving module control unit 421 controlling the FM teletext receiving module 43 which will be explained later, a data converting unit 422 converting the character codes of DARC standards into character codes to be used in the personal computer, and a keyword comparing unit 423 storing the keyword registered by the keyword registering unit 414 of the main unit 41 for comparison of received data with a keyword.

An FM teletext receiving module 43 comprises a receiving circuit 431 and a memory 432 storing received broadcast data.

A PHS module 44 operates as the two-way communication unit previously described.

The FM teletext receiving module 43 is enough when it enables control on a personal computer with application software (available in the market). However, in this embodiment, direct control is not performed from the main unit 41, control is performed by the receiving module control unit 421 provided in the receiving information processing module 42.

Meanwhile, the receiving information processing module 42 is an apparatus comprising an embodiment of the present invention. Although functions of the receiving information processing module 42 can be realized by software executed by the main unit 41, in a preferred embodiment, the receiving information processing module 42 is implemented separate from the main unit 41 to enable operations even if the power supply to the main unit 41 is turned off. Further, even when a user turns off the power supply to the main unit 41 and to the PHS module 44, an FM teletext can be received by operating the main unit 41, receiving information processing module 42, FM teletext receiving module 43 and PHS module 44 with independent power supplies or by operating the receiving information processing module 42 and the FM teletext receiving module 43 with a common power supply independent of the power supply of the main unit 41 and PHS module 44.

In the embodiment of FIG. 4, a first drive control circuit 451 and a second drive control circuit 452 fed by one common power supply 45 are provided. The first drive control circuit 451 controls power fed to the main unit 41 and PHS module 42. The second drive control circuit 452 controls power fed to the receiving information processing module 42 and to the FM teletext receiving module 43. Under ordinary operating conditions, the power supply system of the first drive control circuit 451 turns on only when it is operated by a user and the power supply system of the second drive control circuit 452 is always turned on. Accordingly, the information collection by the FM teletext receiving module 43 is always enabled as the power saving power supply system. Also in an embodiment of the present invention shown in FIG. 4, the control of the first drive control circuit 451 may be provided to the receiving information processing module 42 so that driving the first drive control circuit 451 is timed with the keyword comparing unit 423 receiving the page data including the keyword from the received data (not illustrated).

The main unit 41 and FM teletext module 43 are connected with an interface such as RS232C, etc. However, in the embodiment shown in FIG. 4, the receiving information processing module 42 is inserted between the main unit 41 and FM teletext module 43. Therefore, the main unit 41 and receiving information processing module 42 are connected by an interface such as RS232C, etc. Moreover, the receiving information processing module 42 and FM teletext module 43 are also connected by the same interface.

The main unit 41 and each module 42 to 44 may comprise individual casings, or a card provided in the main unit 41.

Next, the operation of the information collecting apparatus 40 in the above-mentioned embodiment of the present invention will be explained with reference to FIG. 5.

When the power supply of the main unit 41 is turned on, the keyword registration unit 414 is started (step 501) with by a user, and the keyword is registered to the input unit 412.

The registered keyword is transferred to the receiving information processing module 42 by the keyword registering unit 414 and is then stored in the keyword comparing unit 422 of the receiving information processing module 42 (step 502).

When the keyword is registered, the FM teletext receiving condition starts by turning off the power supply of the main unit 41 or completing the operation of the keyword registering unit 414 (or by operating the other application software while the power supply of the main unit 41 is kept on).

As explained previously, both the FM teletext receiving module 43 and the receiving information processing module 42 are always fed even when the power supply of the main unit 41 is turned off, enabling the reception of the FM teletext data. When the FM teletext receiving module 43 receives the FM teletext (step 504), the data converting unit 422 of the receiving information processing module 42 converts the received data described by the character code conforming to the DARC standards into data of the HTML format (S-JIS character code, or Shift-Japan Industrial Standards character code, which is used to input Kanji characters on a computer) (step 505).

The header and message content, which are included in the page data shown in FIG. 2 among the broadcast data of which the character code system has been converted, are compared with the registered keywords (step 506). The page data of which keyword is included in the header or message content is extracted and stored (step 508).

Thereafter, when the reading editor 413 of the main unit 41 is driven by an instruction from a user, the keyword comparing unit 423 transfers the page data being stored to the main unit 41 by an instruction from the reading editor 413. To drive the reading editor 413, power to the main unit 41 and PHS module 44 is turned on (or power saving mode is reset to the ordinary power supply mode) by the first drive control circuit 451 at the time the page data including keyword is received, then the reading editor 413 is driven accordingly.

After the reading editor 413 of the main unit 41 receives the page data in HTML format, the received data is displayed by the reading editor 413 on the display 412 (step 509).

Figure 6:
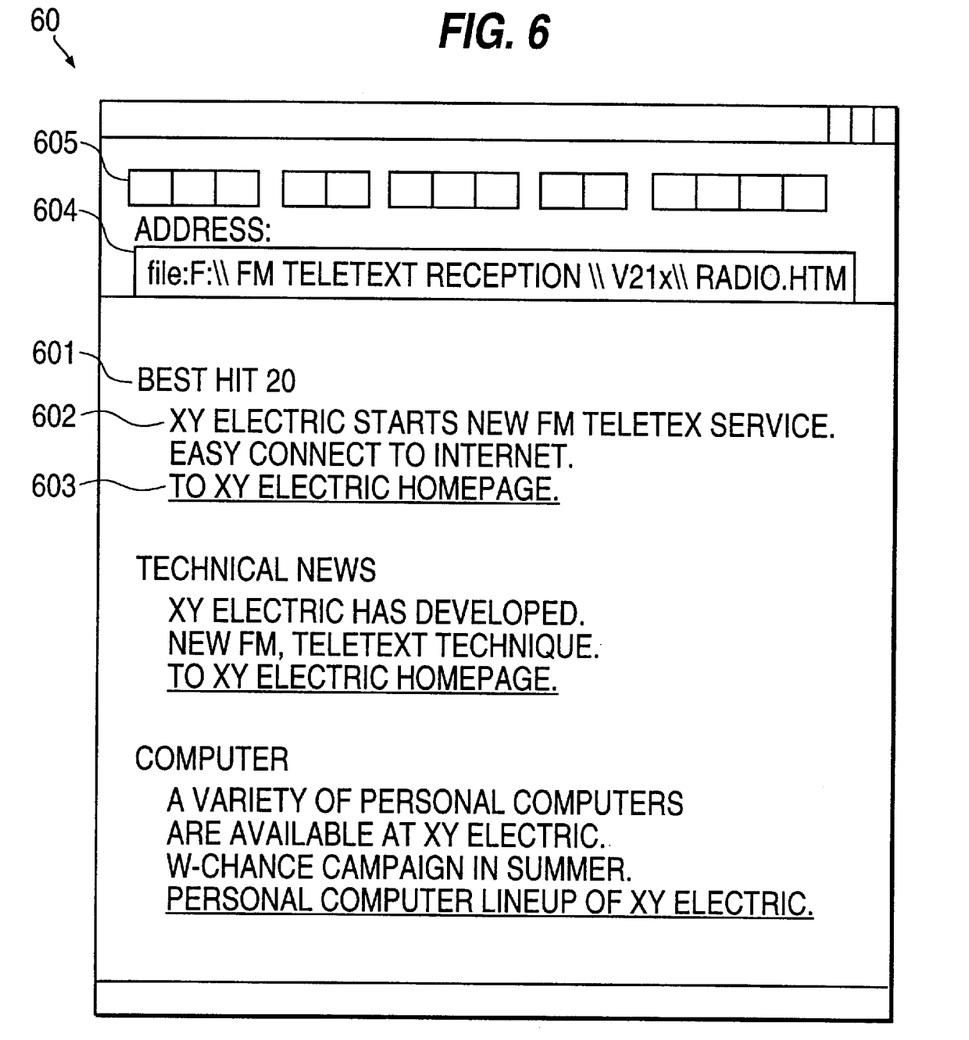
FIG. 6 is a diagram showing an example of the display window of a reading editor of the information collecting apparatus of FIG. 4.

An example of a window image 60 shown by display 412 is shown in FIG. 6. A plurality of page data extracted are displayed in parallel in the sequence of the header 601, message content 602 and link button of the URL 603. FIG. 6 shows an example of retrieval using "XY Electric" as the keyword. This window 60 conforms to an ordinary browser of the INTERNET. In FIG. 6, the window image 600 further comprises an area 604 for displaying the selected URL, and a group of buttons 605 used for instructing operations.

When a user desires the more detailed information of interesting page data, the link button 603 of the URL of the corresponding page data is activated using the input unit 411 (step 510).

The reading editor 413 starts the PHS module 44 when the link button is activated (step 511) to access the file of detailed information using the corresponding URL (step 512). The accessed URL file is displayed on the display 411 (step 513).

As explained above, according to the preferred embodiments of the present invention, when a user previously registers a keyword, the page data including the keyword is automatically extracted and displayed. Therefore, information can be selected very easily.

Moreover, when the keyword is not registered, the keyword is not retrieved and all page data are transferred to the main unit 41 for the selection of page data by the user. In this case, the processing steps, except for steps 501 to 503, 505 and 506, shown in FIG. 5 are executed.

In another embodiment, the keyword registering unit 414 registering the keywords and the keyword comparing unit 423 are not provided, but a user can then read all page data.

As explained previously, according to the information collecting apparatus and receiving information processing apparatus of the present invention, information collection can be realized at a low cost. The present invention accomplishes the foregoing by providing, in addition to two-way communication unit collecting detailed information, a reception-only communication unit which is a communication channel transmitting an address (detailed information address) accessed by the two-way communication unit at a comparatively lower cost than using the two-way communication unit. Moreover, the index information required to retrieve the detailed information can be obtained using the reception-only communication unit, resulting in an assuredly good response for two-way communication and a realization of excellent power saving.

Further, the information transmitting apparatus transmitting information to the information collecting apparatus transmits general addresses of many users by transmitting the index information through the broadcast to providing additional advantages that communication cost is rather low and a problem of increase in the traffic is not generated.

The present invention, therefore, is an information collecting apparatus, comprising reception-only communication means, bothway communication means, and access processing means for extracting address to be accessed from the bothway communication means from the data received by the reception-only communication means to fetch files existing in the address using the bothway communication means.

In addition, the present invention is a receiving information processing apparatus inserted and connected between an information processing apparatus having a bothway communication means, an access means for executing communication utilizing the bothway communication means and a keyword registration means for accepting the keyword registration input and a reception-only communication unit, in which the keyword registered to the keyword registration means is stored, the data received by the reception-only communication means is retrieved using the keyword and the receiving data having the keyword is transferred to the information processing apparatus.

In addition, the present invention is an information transmitting apparatus for transmitting a transmitting data having the standards including the dummy area, in which data is transmitted after the address of the file to be accessed from the bothway communication system independent of the transmitting system is described in the dummy area.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An information collecting apparatus comprising:
    reception-only communication means for receiving data, said data including an address and index information, said reception-only communication means configured to receive the data from a first medium of communication;
    two-way communication means for receiving the data and for transmitting data including the address and the index information and obtaining detail information based upon the index information, said two-way communication means configured to interact with a second medium of communication different than the first medium of communication;
    access processing means for extracting the address to be accessed by said two-way communication means from the data received by said reception-only communication means and for using the address to fetch files existing in said address using said two-way communication means;
    keyword registering means for registering a retrieving keyword; and
    retrieving means for storing said registered keyword and retrieving said received data using said keyword, wherein said access means extracts the address corresponding to said received data including said registered keyword for access from said two-way communication means.

2. An information collecting apparatus as claimed in claim 1, wherein said reception-only communication means comprises a memory storing said received data; and
    a driving power supply driving said reception-only communication means and said retrieving means independent of a driving power supply for said two-way communication means, said keyword registration means, and said access means.

3. An information collecting apparatus as claimed in claim 2, wherein said retrieving means drives said access means when the received data including said registered keyword is extracted.

4. An information collecting apparatus as claimed in claim 2, further comprising:
    display means for displaying one of said received data retrieved by said retrieving means and the data as a part of said received data; and
    input means for accepting an instruction input for selecting data displayed on said display means, wherein said access means extracts the address corresponding to the received data selectively instructed by said input means for access by said two-way communication means.

5. An information collecting apparatus as claimed in claim 1, wherein said reception-only communication means comprises a receiver receiving FM teletext data specified by DARC standards, and wherein said page header comprises a header character string and a message content character string;
    said information collecting apparatus further comprising:
        display means for displaying a uniform resources locator (URL) described in the dummy area of the page data and the button linked to the uniform resources locator (URL), in addition to the header character string and the message content character string of said page header of said FM teletext data;
        input means comprising a pointing device detecting that one of said displayed uniform resources locator (URL) and said button linked to said uniform resources locator (URL) is pointed to as input; and
        said access means executes fetches a uniform resources locator (URL) file corresponding to and based on the point input.

6. An information collecting apparatus as claimed in claim 5, wherein reception-oily communication means comprises:
    a memory storing said received data; and
    power supply driving means for driving said reception-only communication means and said retrieving means, independent of the driving power supply for said two-way communication means, said keyword registration means, said input means and said access means.

7. An apparatus comprising:
an information processing apparatus comprising:
- two-way communication means configured to access a first medium of communication,
- an access means for executing communication utilizing said two-way communication means, and
- a keyword registration means for accepting keyword registration input;

a reception-only communication unit configured to receive information from a second medium of communication different than the first medium of communication; and a receiving information processing apparatus, inserted and connected between the information processing apparatus and the reception-only communication unit, and comprising:
- means for storing the keyword registered to said keyword registration means,
- means for retrieving data received by said reception-only communication means using said keyword, and
- means for transferring the received data comprising said keyword to said information processing apparatus.

8. An apparatus as claimed in claim 7, wherein the access means thereof is controllably driven when the received data including said registered keyword is extracted.

9. An apparatus as claimed in claim 7, wherein the data received by said reception-only communication means is in a data format, and said receiving information processing apparatus further comprises:
- data format converting means for converting the data format of the data received by said reception-only communication means to a data format for information processing by said information processing apparatus.

10. An apparatus as claimed in claim 9, wherein said data format converting means converts the FM teletext data specified by the DARC standards into hypertext markup language (HTML) text.

* * * * *